(12) United States Patent
Hayashi et al.

(10) Patent No.: US 10,601,634 B2
(45) Date of Patent: Mar. 24, 2020

(54) CLOUD SERVICE CONTROL DEVICE HAVING AN INFORMATION TRANSFEROR CONFIGURED TO LIMIT THE TRANSFER OF SERVICE INFORMATION, A CLOUD SERVICE CONTROL SYSTEM HAVING A CLOUD SERVICE CONTROL DEVICE, A RELATED CLOUD SERVICE CONTROL METHOD, AND A RELATED STORAGE MEDIUM

(71) Applicant: Yokogawa Electric Corporation, Tokyo (JP)

(72) Inventors: Hisanori Hayashi, Tokyo (JP); Ken-ichi Inoue, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 85 days.

(21) Appl. No.: 15/861,777

(22) Filed: Jan. 4, 2018

(65) Prior Publication Data
US 2018/0198673 A1 Jul. 12, 2018

(30) Foreign Application Priority Data
Jan. 10, 2017 (JP) .................................. 2017-001994

(51) Int. Cl.
| | | |
|---|---|---|
| G06F 15/173 | (2006.01) | |
| H04L 29/08 | (2006.01) | |
| G06F 9/50 | (2006.01) | |
| H04L 12/24 | (2006.01) | |

(52) U.S. Cl.
CPC ...... *H04L 29/08972* (2013.01); *G06F 9/5072* (2013.01); *H04L 41/5038* (2013.01); *H04L 67/025* (2013.01); *H04L 67/327* (2013.01); *G05B 2219/14006* (2013.01); *H04L 67/1097* (2013.01); *H04L 67/12* (2013.01)

(58) Field of Classification Search
CPC .......................... H04L 41/5038; H04L 67/327
USPC ....................................................... 709/224
See application file for complete search history.

(56) References Cited

U.S. PATENT DOCUMENTS

| | | | |
|---|---|---|---|
| 7,970,830 B2 | 6/2011 | Staggs et al. | |
| 9,152,465 B2 | 10/2015 | Prasad et al. | |
| 2010/0257228 A1* | 10/2010 | Staggs .................. | G06F 9/5027 709/203 |

(Continued)

FOREIGN PATENT DOCUMENTS

| | | |
|---|---|---|
| JP | 2012-523038 A | 9/2012 |
| JP | 2013-134711 A | 7/2013 |

(Continued)

*Primary Examiner* — Hee Soo Kim
(74) *Attorney, Agent, or Firm* — Sughrue Mion, PLLC

(57) ABSTRACT

A cloud service control device includes a first communicator configured to control communication with a cloud service providing a plant control function of controlling a plant, a second communicator configured to control communication with a first device using service information related to the cloud service, a verifier configured to verify an operation state of the cloud service, a selector configured to select the cloud service on the basis of the verified operation state, and an information transferor configured to transfer the service information between the selected cloud service and the first device.

19 Claims, 11 Drawing Sheets

(56) References Cited

U.S. PATENT DOCUMENTS

2014/0052837 A1* 2/2014 Prasad .................. G06F 9/5027
709/223
2015/0163285 A1   6/2015 Chakra et al.
2016/0004491 A1   1/2016 Amano et al.
2017/0134212 A1   5/2017 Sakakura

FOREIGN PATENT DOCUMENTS

| JP | 2016-15095 A | 1/2016 |
| WO | 2010/120440 A2 | 10/2010 |
| WO | 2015140908 A1 | 9/2015 |

* cited by examiner

CLOUD SERVICE CONTROL DEVICE HAVING AN INFORMATION TRANSFEROR CONFIGURED TO LIMIT THE TRANSFER OF SERVICE INFORMATION, A CLOUD SERVICE CONTROL SYSTEM HAVING A CLOUD SERVICE CONTROL DEVICE, A RELATED CLOUD SERVICE CONTROL METHOD, AND A RELATED STORAGE MEDIUM

BACKGROUND OF THE INVENTION

Field of the Invention

The present invention relates to a cloud service control device, a cloud service control system, a cloud service control method, and a storage medium.

The present application claims priority based on Japanese patent application 2017-1994, filed on Jan. 10, 2017 and includes herein by reference the content thereof.

Description of Related Art

In factories in a manufacturing industry and plants such as industrial plants such as chemical plants and the like, plants for managing and controlling well sites such as gas fields, oil fields, and their surroundings, plants for managing and controlling hydroelectric power generation, thermal power generation, and nuclear power generation, plants for managing and controlling environmental power generation such as solar power generation and wind power generation, and plants for managing and controlling drinking water and sewage, dams, and the like (hereinafter collectively referred to as plants), a production control system represented by a distributed control system (DCS) in which an on-site device such as a measuring instrument or an operating instrument referred to as a field device and a control device for controlling the on-site device are connected via a communication means has been constructed to implement advanced automatic operations. In particular, there are some cases where operation control of the above-described type of plant is generally executed by a DCS configured to implement high reliability.

For example, various computer systems such as a basic operation system, an operation control system, a facility management system, and a manufacturing execution system are used in the plant control constructed to implement the advanced automatic operation as described above. The basic operation system is a system configured to manage management resources such as an accounting process of the entire company operating a plant, sales management including received order management, and production management for creating a production plan on the basis of received order information, and production management for ordering raw materials or the like. The operation control system is a system configured to perform operation control of all or a part of the plant by controlling a field device and a facility control system to be described below. The facility management system is a system configured to monitor and/or diagnose states of various types of facilities including a field device such as a control facility responsible for an operation and automatic control of a single specific device constituting a plant. The manufacturing execution system is a system located between the basic operation system and the operation control system and configured to operate an operation control system or operate a facility control system via the operation control system on the basis of a production plan acquired from the basic operation system, execute the production plan, verify and record an execution result, and support an operation of the plant according to a function of providing a notification to the basic operation system if necessary. The facility management system may include a system for energy management of plants, environmental management related to environmental burden, safety management, or security management.

These computer systems used in plant control are implemented by devices such as a DCS, a programmable logic controller (PLC), an industrial computer, a general-purpose desktop computer, and a server device.

There are some cases where a part of a plant control program and/or data to be executed in these computer systems used in plant control is implemented by a cloud service provided by cloud computing via a network (see, for example, Published Japanese Translation No. 2012-523038 of the PCT International Publication, PCT International Publication No. WO2010/120440, and U.S. Pat. No. 7,970,830). Cloud computing is a used scheme using a computer system in the form of a service (a cloud service) by operating software and using data on a computer system which is constituted of a physical computer group (a computer network) connected via a network and which operates as a plurality of independent virtual computers. A cloud service is a service provided according to the above-described scheme, and service availability, reliability, maintainability, security, and the like provided according to a system configuration of cloud computing and the number of components and the performance of the components vary.

SUMMARY OF THE INVENTION

There are some cases where the provision of a service is stopped or delayed, for example, due to a network failure or the like, in a cloud service. When a computer system stops due to a failure or the like in plant control, there are some cases where the operation and the safety management of the plant are affected. In particular, because many days and costs are incurred for restoration if the plant stops in material-based manufacturing plants, the computer system is also required to operate without a failure for a long period of time. Therefore, for example, a cloud service limited to functions of plant control affecting the operation of the plant less has been used to reduce this risk when a cloud service has been used in plant control.

When a complicated production system including a plurality of systems as described above already operating on a physical computer system is shifted to a cloud system, there are some cases where it is not possible to construct a flexible computer system using a cloud system according to a configuration of a physical computer system in order to avoid the above-mentioned sharp increase in risk or in order to shift a complicated production system to a cloud service sequentially from a function affecting the operation of the plant least, sequentially according to an operation procedure in consideration of safety, or sequentially according to budget limitations due to budgetary reasons for facility investment.

There are some cases where material-based plants are operated continuously for several years and shifting of a computer system to a cloud system is required to be performed, for example, during a short period of time in which an operation of a plant is stopped in a periodic checking process.

When information obtained by a cloud service is provided to an external computer system, it is necessary to prevent leakage of confidential information such as the operation plan used in plant control, the know-how of plant control, and the operation conditions of the plant.

One aspect of the present invention provides a cloud service control device, a cloud service control system, a cloud service control method, and a storage medium in which availability and information security are high and a shift to a faster and more flexible system is possible.

A cloud service control device according to a first aspect of the present invention may include a first communicator configured to control communication with a cloud service providing a plant control function of controlling a plant, a second communicator configured to control communication with a first device using service information related to the cloud service, a verifier configured to verify an operation state of the cloud service, a selector configured to select the cloud service on the basis of the verified operation state, and an information transferor configured to transfer the service information between the selected cloud service and the first device.

In the above-described cloud service control device, the verifier may be configured to verify the operation state of the cloud service on the basis of a self-diagnosis result of the cloud service having a self-diagnosis function.

In the above-described cloud service control device, the verifier may be configured to verify the operation state of the cloud service on the basis of fixed period information exchanged between the self-diagnosis function and the cloud service control device in a fixed period.

In the above-described cloud service control device, the verifier may be configured to verify the operation state of the cloud service on the basis of an acquisition time from a request of a process for the cloud service to acquisition of a processing result.

In the above-described cloud service control device, the verifier may be configured to verify operation states of a plurality of cloud services. The selector may be configured to select one cloud service from the plurality of cloud services on the basis of the verified operation states.

In the above-described cloud service control device, the information transferor may be configured to limit a transfer of the service information in accordance with the first device.

In the above-described cloud service control device, the information transferor may be configured to limit the transfer of the service information in accordance with the first device on the basis of an association list in which the first device is associated with the service information transferable to the first device.

In the above-described cloud service control device, the first communicator may be configured to control communication with a physical computer system. The verifier may be configured to verify operation states of the cloud service and the physical computer system. The selector may be configured to select any one of the cloud service and the physical computer system on the basis of the verified operation states.

In the above-described cloud service control device, the first communicator may be configured to communicate with the cloud service for providing the plant control function related to basic operation. The information transferor may be configured to transfer the service information related to the basic operation.

In the above-described cloud service control device, the first communicator may be configured to communicate with the cloud service for providing the plant control function related to manufacturing execution of the plant. The information transferor may be configured to transfer the service information related to the manufacturing execution.

In the above-described cloud service control device, the first communicator may be configured to communicate with the cloud service for providing the plant control function related to operation control of the plant. The information transferor may be configured to transfer the service information related to the operation control.

In the above-described cloud service control device, the first communicator may be configured to communicate with the cloud service for providing the plant control function related to facility management of the plant. The information transferor may be configured to transfer the service information related to the facility management.

In the above-described cloud service control device, the selector may be configured to select any cloud service in any order.

A cloud service control system according to a second aspect of the present invention may include a cloud service configured to provide a plant control function of controlling a plant, a first communicator configured to control communication with the cloud service, a second communicator configured to control communication with a first device using service information related to the cloud service, a verifier configured to verify an operation state of the cloud service, a selector configured to select the cloud service on the basis of the verified operation state, and an information transferor configured to transfer the service information between the selected cloud service and the first device.

In the above-described cloud service control system, the verifier may be configured to verify the operation state of the cloud service on the basis of a self-diagnosis result of the cloud service having a self-diagnosis function.

In the above-described cloud service control system, the verifier may be configured to verify the operation state of the cloud service on the basis of fixed period information exchanged between the self-diagnosis function and the cloud service control device in a fixed period.

In the above-described cloud service control system, the verifier may be configured to verify the operation state of the cloud service on the basis of an acquisition time from a request of a process for the cloud service to acquisition of a processing result.

In the above-described cloud service control system, the verifier may be configured to verify operation states of a plurality of cloud services. The selector may be configured to select one cloud service from the plurality of cloud services on the basis of the verified operation states.

A cloud service control method according to a third aspect of the present invention may include verifying an operation state of a cloud service for providing a plant control function of controlling a plant, selecting the cloud service on the basis of the verified operation state, and transferring service information related to the cloud service between the selected cloud service and a first device using the service information related to the cloud service.

A non-transitory computer-readable storage medium according to a fourth aspect of the present invention may store a cloud service control program, which when executed by a computer, causes the computer to verify an operation state of a cloud service for providing a plant control function of controlling a plant, select the cloud service on the basis of the verified operation state, and transfer service information related to the cloud service between the selected cloud service and a first device using the service information related to the cloud service.

According to the one aspect of the present invention, it is possible to provide a cloud service control device, a cloud service control system, a cloud service control method, and

DETAILED DESCRIPTION OF THE INVENTION

Hereinafter, a cloud service control device, a cloud service control system, a cloud service control method, and a storage medium according to an embodiment of the present invention will be described in detail with reference to the drawings.

<First Configuration Example of Cloud Service Control System>

Figure 1:
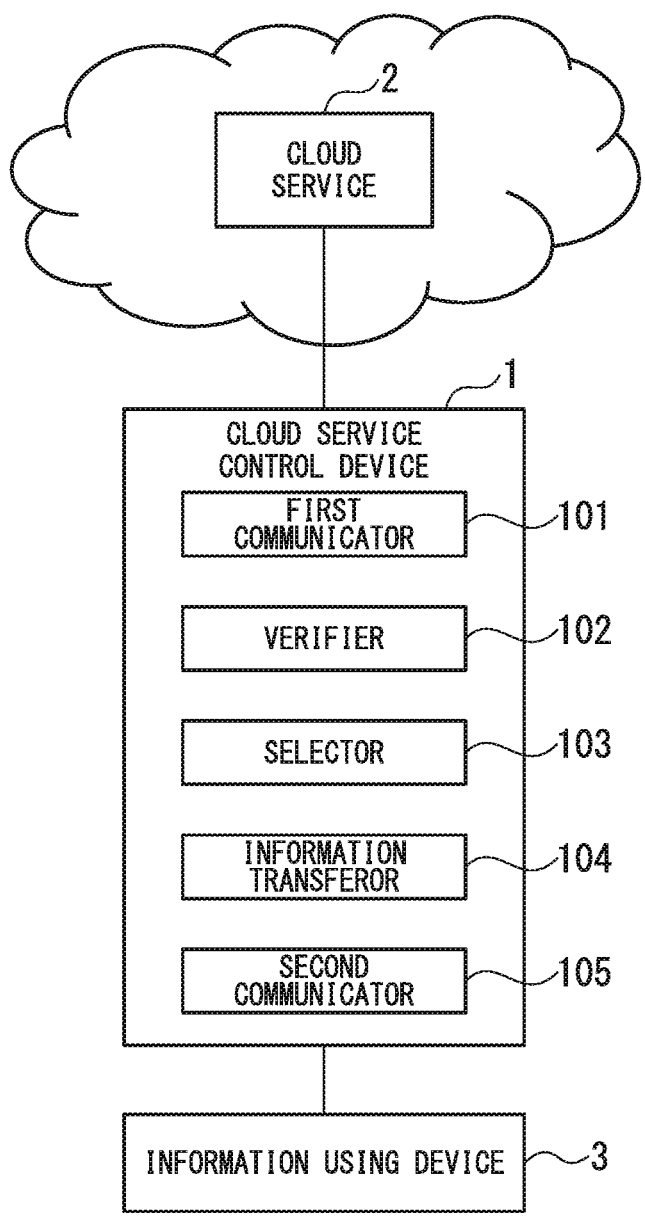
FIG. 1 is a diagram showing a first configuration example of a cloud service control system according to an embodiment.

A configuration of a cloud service control system will be described with reference to FIG. 1. FIG. 1 is a diagram showing a first configuration example of a cloud service control system according to an embodiment.

In FIG. 1, the cloud service control system 100 includes a cloud service control device 1, a cloud service providing device 2, and an information using device 3. The cloud service control device 1 is connected to the cloud service providing device 2 via a network so that communication is enabled according to wired communication or wireless communication. The cloud service control device 1 is connected to the information using device 3 so that communication is enabled according to wired communication or wireless communication. In the present embodiment, the cloud service control device 1 or the information using device 3 is configured, for example, in a physical computer system. On the other hand, the cloud service providing device 2 is a computer system including a group of physical computers and operating as a plurality of independent virtual computers. In a virtual computer system, for example, one computer device can be operated as a plurality of computer devices or a plurality of computer devices can be operated as one computer device. In the cloud service provided in the virtual computer system, a device configuration can be appropriately changed according to a load state or the like. On the other hand, if the configuration of the device is appropriately changed in a virtual computer system, there are some cases where the operating state is also fluctuate appropriately, and the availability due to a failure or the like also changes. In the present embodiment, availability is improved in the cloud service control device 1 connected to the cloud service providing device 2. The cloud service control device 1 or the information using device 3 may also be configured in the virtual computer system.

The cloud service providing device 2 is a system in which a cloud service configured to provide a plant control function of controlling a plant is operated by cloud computing. A cloud service configured to provide the plant control function is a cloud service provided by operating a plant control program having the plant control function on a virtual computer system connected via a network. The plant control function is a function capable of being implemented, for example, by executing a computer program configured to execute manufacturing execution, operation control, facility management, or the like. The cloud service providing device 2 provides service information related to a cloud service configured to provide plant control functions such as manufacturing execution, operation control, and facility management to the information using device 3. The service information related to the cloud service includes information processed in the cloud service and information to be processed in the cloud service. The service information includes information such as data, a control command, or a program. In the present embodiment, for example, information to be used for plant control such as plant manufacturing execution such as information related to order reception/ordering or information related to creation of a production plan among information related to the basic operation system is included in service information. Therefore, the plant control function provided by the cloud service providing device 2 includes functions provided by the basic operation system.

In the following description, a plant in the manufacturing industry is shown as an example of a plant, and the cloud service providing device 2 provides a cloud service having a manufacturing industry control function. The details of the cloud service provided in the cloud service providing device 2 will be described below.

The information using device 3 uses service information related to a cloud service configured to provide a plant control function. The service information related to the cloud service is, for example, information processed in the cloud service or information to be processed in the cloud service. The use of service information means, for example, acquiring information processed in a cloud service and processing the acquired information on its own, or operating a cloud service by providing information to be processed in the cloud service to the cloud service. For example, the information using device 3 receives service information transmitted from the cloud service control device 1 or requests the cloud service control device 1 to acquire service information. For example, the information using device 3 provides the cloud service control device 1 with information stored by the information using device 3 or information processed by the information using device 3.

The information using device 3 is, for example, a basic operation system, a manufacturing execution system, an operation control system, a facility management system, or the like in the manufacturing industry. That is, in the present embodiment, a part or all of a process to be performed in the basic operation system, the manufacturing execution system, the operation control system, the facility management system or the like in the manufacturing industry is shifted to the cloud service provided by the cloud service providing device 2 and information related to the cloud service is used in the information using device 3.

The information using device 3 is, for example, a device configured to provide a basic operation system, a production execution system, an operation control system, or a facility management system, which is a system configured to provide a service related to plant control. The information using device 3 may be a field device connected by a communication means such as a fieldbus. The information using device 3 may be a control system for each production facility constituting a plant including a field device, a facility management system configured to monitor and/or diagnose a facility state, or a weather forecast information providing system, an order reception/ordering system, or an energy demand response system (a DR system) configured to provide information related to plant control.

The cloud service control device 1 has functions of a first communicator 101, a verifier 102, a selector 103, an information transferor 104, and a second communicator 105. The above-described functions of the cloud service control device 1 are functional modules implemented by a cloud service control program configured to control the cloud service control device 1. The cloud service control program may be provided from a server configured to provide a program or may be provided from a storage medium. The functions of the first communicator 101, the verifier 102, the selector 103, the information transferor 104, and the second communicator 105, which constitute the cloud service control device 1, may be executed by a program as software and all or some of the functions may be implemented as hardware. The purpose of implementing the functions as hardware is that there are improvements in reliability, "an easy to understand operating state" and "a sense of security" when viewed from humans. The function of the cloud service control device 1 may be a cloud service different from a cloud service provided by the cloud service providing device 2 provided according to cloud computing. For example, cloud services to be used are distinguished according to differences in availability of cloud services.

The first communicator 101 controls communication with the cloud service providing device 2. For example, the first communicator 101 controls communication using an Internet protocol. The first communicator 101 may perform predetermined encryption or decryption on information which is transmitted and received in communication with the cloud service providing device 2. The first communicator 101 may communicate with a plurality of cloud service providing devices (not shown). Communication between the first communicator 101 and the cloud service providing device 2 is performed via a network device such as a router (not shown).

The second communicator 105 controls communication with the information using device 3. For example, the second communicator 105 controls communication using the Internet protocol. The second communicator 105 may perform predetermined encryption or decryption on information which is transmitted and received in communication with the information using device 3. The second communicator 105 may communicate with a plurality of information using devices not shown. The communication between the second communicator 105 and the information using device 3 is performed via a network device such as a router not shown.

The verifier 102 verifies the operation state of the cloud service provided by the cloud service providing device 2. The verification of the operation state is a process of confirming whether or not there is an abnormality, for example, according to communication interruption or a communication delay between the cloud service providing device 2 and the first communicator 101, the presence/absence of suspension, a processing delay, or an erroneous process of the cloud service provided by the cloud service providing device 2, a state of heartbeat communication to be exchanged with the cloud service control device 1 via a program operating in the cloud service providing device 2 and the first communicator 101, an operation state notification (for example, aborting of a task) of a program operating in the cloud service providing device 2 from an operating system of the cloud service control device 1, a response state and a response time until a packet indicating a processing result is transmitted from the cloud service providing device 2 to the cloud service control device 1 after a processing request packet is transmitted from the cloud service control device 1 to the cloud service providing device 2, the identity of an ID number included in a set of pieces of input information indicating a state of the plant to be described below, or the like, by using the cloud service providing device 2, a program operating on the cloud service providing device 2, and an operation state of the first communicator 101 of the cloud service control device 1 as a verification target.

When the cloud service provided by the cloud service providing device 2 has a self-diagnosis function, the verifier 102 verifies the operation state of the cloud service on the basis of a self-diagnosis result of the cloud service. Details of the function of the verifier 102 when the cloud service provided by the cloud service providing device 2 has the self-diagnosis function will be described below with reference to FIG. 3.

The verifier 102 may verify the operation state of the cloud service on the basis of processing results in the cloud services provided by the plurality of cloud service providing devices 2. For example, the verifier 102 compares the processing results acquired from the plurality of cloud service providing devices 2 and verifies the operation state of the cloud service on the basis of whether or not the cloud service providing device 2 outputs a correct processing result. For example, specifically, when a set of pieces of input information indicating the state of a plant at a specific time, which is collected by the information using device 3 and provided to the cloud service, is subjected to arithmetic processing in the cloud service and is provided as a set of pieces of control output information for each part of the plant to the information using device in a cloud service referred to as a control program to be executed in a fixed period, the verifier operates to verify the set of pieces of input information. The set of pieces of input information includes an ID number including time information. The set of pieces of control output information includes both an ID number of a set of pieces of input information and an ID number of a set of pieces of output information. Whether or not the cloud service providing device 2 is outputting the correct processing result can be determined by majority decision from, for example, processing results of a plurality of cloud service providing devices 2. For example, there is a case in which only a certain cloud service does not return information indicating that a set of pieces of input information has been received or a case in which only an ID of output information of a certain cloud service is different. if an incorrect processing result is used, there are some cases where problems are caused, for example, in the operation and safety of the plant. The verifier 102 verifies the processing result of the cloud service, thereby preventing the use of an erroneous processing result.

The verifier 102 may verify the operation state of the cloud service on the basis of an acquisition time of the processing result acquired from the cloud service providing device 2. For example, if the processing result cannot be acquired within a predetermined time, there is a possibility that a malfunction such as a decrease in the processing speed of the cloud service providing device 2, deterioration of the network state, or the like will occur. When the processing result cannot be acquired within a predetermined time, the verifier 102 verifies that the operation state of the cloud service is defective. The predetermined time may be preset for each cloud service. By setting the predetermined time for each cloud service, it is possible to verify the appropriate operation state for each cloud service.

The verifier 102 outputs a verification result of the operation state of the cloud service to the selector 103. The verifier 102 may display the verification result on a display or the like, print the verification result from a printer or the like, record the verification result in a recording device, or convey the verification result to another system, thereby improving maintainability.

The selector 103 operates when there are a plurality of cloud systems providing services, and selects a cloud service to be used on the basis of the verification result of the operating state of the cloud service verified by the verifier 102. The selection of the cloud service is selection of whether or not to use a cloud service provided by any one cloud service providing device. The available cloud service may be pre-registered. On the basis of the verification result, the selector 103 selects the pre-registered cloud service. In the present embodiment, because the selector 103 selects a cloud service on the basis of the verification result in the verifier 102 and because verification and selection are performed in units of information processing, the computing processing is not interrupted and it is possible to increase the availability and safety in the plant because it is possible to avoid stopping the operation of the plant due to stopping of the cloud service and avoid using erroneous processing information in the cloud service. The selector 103 makes it possible to select any cloud service in any order.

The information transferor 104 transfers information related to the cloud service selected by the selector 103 to the information using device 3 via the second communicator 105. The information transferor 104 transfers the information related to the cloud service provided by the cloud service providing device 2 acquired by the first communicator 101 to the information using device 3 by a predetermined communication method.

The information transferor 104 limits the content of the information to be transferred. The information transferor 104 compares a content list (an association list) in which a plurality of information using devices 3, which are communication partners to which information is transferred, are associated with information to be transferred specified for each information using device 3 with the content of current information to be processed (to be transferred), determines information capable of being transferred, and transfers only the information capable of being transferred to the information using device 3. The information transferor 104 may be configured to transfer information capable of being transferred generated by processing or modifying information obtained using the cloud service provided by the cloud service providing device 2. Details of limitations on the content of information to be executed and transferred in the information transferor 104 will be described below.

A case in which the functions of the first communicator 101, the verifier 102, the selector 103, the information transferor 104, and the second communicator 105 provided in the cloud service control device 1 are implemented by software has been described with reference to FIG. 1. However, one or more of the functions described above may be implemented by hardware. Each of the above functions may be implemented by dividing one function into a plurality of functions. Each of the above-described functions may be implemented by integrating two or more functions into one function.

Figure 2:
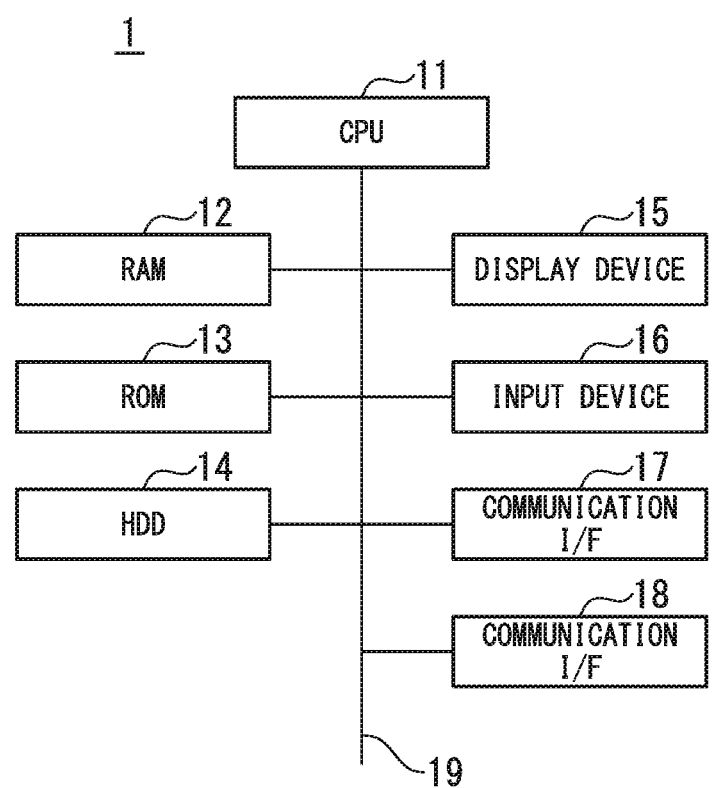
FIG. 2 is a block diagram showing an example of a hardware configuration of a cloud service control device according to an embodiment.

Next, the hardware configuration of the cloud service control device 1 will be described with reference to HG. 2. FIG. 2 is a block diagram showing an example of the hardware configuration of the cloud service control device according to the embodiment.

In FIG. 2, the cloud service control device 1 includes a central processing unit (CPU) 11, a random access memory (RAM) 12, a read only memory (ROM) 13, a hard disk drive (HDD) 14, a display device 15, an input device 16, a communication interface (I/F) 17, a communication I/F 18, and a bus 19 configured to connect these components.

The cloud service control device 1 is, for example, a device configured to hold hardware as shown in FIG. 2 in a robust and sturdy housing capable of being installed at the site of process automation, and can be implemented by a server device, a general-purpose computer such as a desktop PC, an industrial computer, a device such as a PLC, a notebook type or tablet type computer, a PDA, a smartphone, or the like. The cloud service control device 1 can be configured to be redundant (multiplexed or decided by majority) in accordance with a degree of reliability requirement. For example, all computer resources or some computer resources are configured to be duplexed when the cloud service control device 1 has a duplex configuration and the provision of a cloud service is switched to the other normal computer resource when an error is found in one duplexed computer resource.

The CPU 11 executes a program stored in the RAM 12, the ROM 13, or the HDD 14 to control the cloud service control device 1. The CPU 11 executes a cloud service control program for implementing each function of the cloud service control device 1 described with reference to FIG. 1. The cloud service control program is acquired from, for example, a storage medium in which a cloud service control program is recorded, a server configured to provide a cloud service control program via a network, or the like, installed in the HDD 14, and stored in the RAM 12 so that the cloud service control program is readable from the CPU 11.

The display device 15 is, for example, a liquid crystal display having a display function. The display device 15 may be implemented in various forms such as a head mount type display, an eyeglass type display, and a wristwatch type display. The input device 16 is, for example, a keyboard or a mouse having an input function. The input device 16 may be a microphone configured to input sound information, a camera configured to input image information, or the like. The display device 15 and the input device 16 may be implemented by a device having a display function and an input function such as a touch panel.

The communication I/F 17 and the communication I/F 18 perform communication control such as data transmission/reception, voice communication, e-mail transmission/reception and the like with other devices connected via wired communication or wireless communication. The communication I/F 17 is an I/F for a cloud service providing device configured to control communication with the cloud service providing device 2 of FIG. 1, which is connected as a first communicator. The communication I/F 18 is an I/F for an information using device configured to control communication with the information using device 3 of FIG. 1, which is connected as a second communicator via wired communication or wireless communication. The communication I/F 18 may control communication with an external system which will be described below with reference to FIG. 5 and the like.

For example, the communication I/F 17 or the communication I/F 18 performs communication control corresponding to general-purpose communication standards such as wireless LAN communication, wired LAN communication, infrared communication, and short-distance wireless communication. The general-purpose communication standards are, for example, a communication standard conforming to IEEE 802, and a communication standard such as TCP/IP. For example, the communication I/F 17 or the communication I/F 18 may perform communication control corresponding to a communication standard (field communication) specific for an industrial instrument such as an International Society of Automation (ISA) 100.11a, which is a wireless communication standard of ISA, a Highway Addressable Remote Transducer (HART) (registered trademark), BRAIN (registered trademark), FOUNDATION Fieldbus, or PROFIBUS. The communication I/F 17 or the communication I/F 18 may refer to information stored in the RAM 12 or the HDD 14 from an externally connected computer or the like or may enable operations of the verifier 102 and the selector 103.

The communication I/F 17 controls communication corresponding to a plurality of cloud services. In FIG. 2, a case in which the cloud service control device 1 has one communication I/F 17 in terms of hardware is shown. However, for example, if the cloud service control device 1 communicates with a plurality of cloud services at the same time, the cloud service control device 1 may have a plurality of communication I/Fs 17 in terms of hardware in order to improve a communication rate. If a plurality of cloud services require different communication schemes, the cloud service control device 1 may be configured to have a plurality of communication I/Fs 17 corresponding to different communication schemes.

Likewise, the communication I/F 18 controls communication corresponding to a plurality of information using devices 3 or external systems. In FIG. 2, a case in which the cloud service control device 1 has one communication I/F 18 in terms of hardware is shown. However, for example, if the cloud service control device 1 communicates with a plurality of information using devices 3 or external systems at the same time, the cloud service control device 1 may be configured to have a plurality of communication I/Fs 18 in terms of hardware to improve a communication rate. If a plurality of information using devices 3 or external systems request different communication schemes, the cloud service control device 1 may be configured to have a plurality of communication I/Fs 18 corresponding to different communication schemes.

<Second Configuration Example of Cloud Service Control System>

Figure 3:
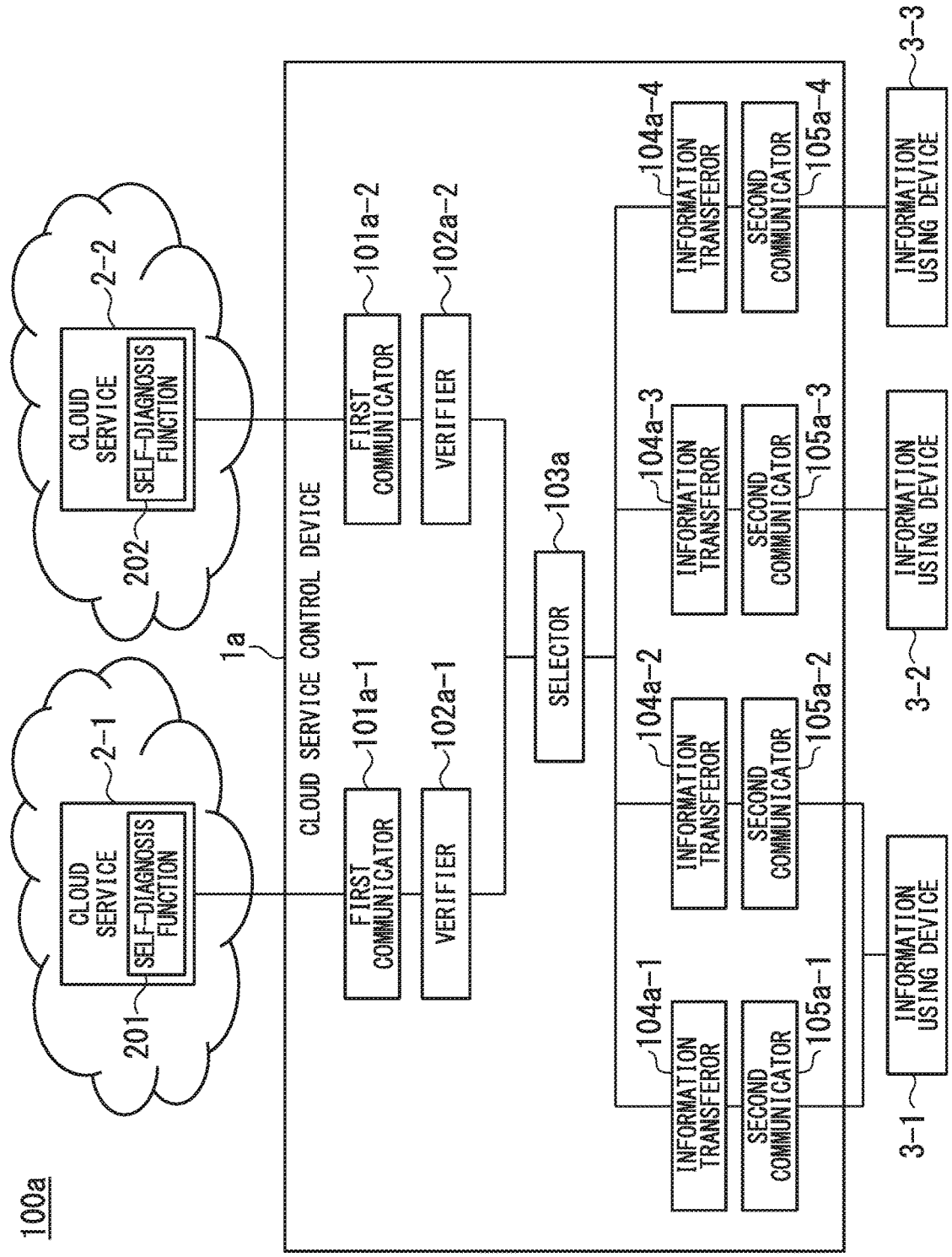
FIG. 3 is a diagram showing a second configuration example of a cloud service control system according to the embodiment.

Next, a second configuration of the cloud service control system described with reference to FIG. 1 will be described with reference to FIG. 3. FIG. 3 is a diagram showing a second configuration example of the cloud service control system according to the embodiment. In FIGS. 3 to 10, the same reference signs are given to components similar to those in FIG. 1, and description thereof will be omitted. In FIGS. 3 to 10, the components in which "a to e" are attached to the same reference signs as those of HG. 1 indicate modified examples of the embodiment.

FIG. 3 shows a case in which the cloud service provided by the cloud service providing device 2 in FIG. 1 has a self-diagnosis function. In FIG. 3, a cloud service control system 100a includes a cloud service control device 1a, a cloud service providing device 2-1, a cloud service providing device 2-2, an information using device 3-1, an information using device 3-2, and an information using device 3-3. The cloud service control device 1a is connected to the cloud service providing device 2-1 and the cloud service providing device 2-2 via a network so that communication is enabled according to wired communication or wireless communication. The cloud service control device 1a is connected to the information using device 3-1, the information using device 3-2, and the information using device 3-3 via a network so that communication is enabled according to wired communication or wireless communication.

The cloud service providing device 2-1 has a self-diagnosis function 201. The cloud service providing device 2-2 has a self-diagnosis function 202. The self-diagnosis function is a function of performing self-diagnosis of whether or not a hardware resource or a software resource of the cloud service providing device is operating normally and transmitting a diagnosis result to another device. For example, the self-diagnostic function is a function of detecting a failure or an abnormality in hardware of a physical computer group configured to provide a cloud service and its peripheral devices and an operation abnormality, a resource shortage, or the like in software operating on the physical computer group to perform diagnosis of whether or not it is possible to provide the cloud service normally in a program configured to operate in the cloud service providing device and providing a notification to a system configured to receive the provision of the cloud service according to wired communication or wireless communication via a network.

The cloud service providing device 2-1 and the cloud service providing device 2-2 constitute a pair of redundancy. Redundancy of the cloud service in the present embodiment refers to a method of improving availability by using a plurality of cloud service providing devices. In the redundancy of the cloud service, for example, if an abnormality such as a failure occurs and the provision of a service becomes difficult in one cloud service providing device, another cloud service providing device provides the cloud service instead thereof. The other cloud service providing device configured to provide the cloud service instead provides a cloud service simultaneously even when one cloud service providing device is operating normally in an active state, so that it is possible to continue the provision of the cloud service without interruption even when an abnormality occurs in one cloud service providing device.

Regardless of whether the cloud service providing device 2-1 is in an active state or a standby state, the self-diagnosis function 201 diagnoses the occurrence of an abnormality of a hardware resource or the like in the cloud service providing device 2-1 and transmits a heartbeat signal indicating that its own cloud service provision is normal to the network at predetermined time intervals when there is no abnormality. For example, a transmission method such as broadcasting or multicasting can be used for transmitting the heartbeat signal. In place of the heartbeat signal, the self-diagnosis function 201 may use an information packet (fixed period information) generated by a task in which the information using device and the cloud service transfer information in a fixed period. If the provision of the cloud service of the cloud service providing device 2-2 is normal but the verifier 102a fails to acquire the heartbeat signal from the cloud service providing device 2-1 for a predetermined time or the like, the verifier 102a determines that an abnormality has occurred in the service providing device 2-1, and the selector 103a switches the provision of information related to the cloud service for the information transferor 104a from the cloud service providing device 2-1 to the cloud service providing device 2-2. The self-diagnosis function 202 in the cloud service providing device 2-2 also has a function similar to the self-diagnosis function 201.

The cloud service control device 1a has functions of a first communicator 101a (101a-1 and 101a-2), a verifier 102a (102a-1 and 102a-2), a selector 103a, an information transferor 104a (104a-1, 104a-2, 104a-3, and 104a-4), and the second communicator 105a (105a-1, 105a-2, 105a-3, and 105a-4). Each function of the first communicator 101a or the like has a function corresponding to a case in which the cloud service providing device 2-1 having the self-diagnosis function 201 configures a redundancy pair with the cloud service providing device 2-2 with respect to each function of the first communicator 101 or the like described with reference to FIG. 1. That is, the first communicator 101a and the like become redundant as necessary. FIG. 3 shows a case in which the first communicator 101a-1 and the verifier 102a-1 are configured to correspond to the cloud service providing device 2-1 and the first communicator 101a-2 and the verifier 102a-2 are configured to correspond to the cloud service providing device 2-2.

The first communicator 101a controls communication with the cloud service providing device 2-1 and the cloud service providing device 2-2. The communication line between the cloud service providing devices 2-1 and 2-2 and the cloud service control device is made redundant, and it is possible to perform communication by selecting one robust pair between the pair of the first communicator 101a-1 and the verifier 102a-1 and the pair of the first communicator 101a-2 and the verifier 102a-2.

The verifier 102a verifies the operation state of the cloud service provided by the cloud service providing device 2-1 on the basis of the self-diagnosis result of the self-diagnosis function 201 of the cloud service providing device 2-1 in an active state. If the cloud service providing device 2-1 fails to acquire the heartbeat signal within a predetermined time from the cloud service providing device 2-1, the verifier 102a can verify that the cloud service providing device 2-1 is in an abnormal operation state. In FIG. 3, in the case of the redundancy configuration or the majority decision configuration, even when the verifier 102a-1 and the verifier 102a-2 are arranged independently in association with the first communicator 101a-1 and the first communicator 101a-2 connected to different cloud service providing devices and the connected cloud service providing devices are in an active state, it is possible to perform verification in parallel on the basis of the self-diagnosis result.

The selector 103a selects the cloud service of the cloud service providing device 2-2 on the basis of a verification result of the cloud service providing device 2-1 verified by the verifier 102a. Although a case in which the cloud service providing device 2-2 transitions from a standby state to an active state and provides the cloud service instead of the cloud service providing device 2-1 when an abnormality occurs in the cloud service providing device 2-1 has been described with reference to FIG. 3, for example, the selector 103a may search for and select a cloud service providing device configured to provide a cloud service under preset conditions. For example, the selector 103a may be configured to record an acquisition state of the heartbeat signal and select a cloud service providing device in which non-reception or delay of the heartbeat signal is absent. The selector 103a may be configured to exclude a cloud service providing device that has not yet received the heartbeat signal or the like from the selection target. The selector 103a may be configured to exclude another cloud service (not shown) operating on a cloud system in which a cloud service providing device in which non-reception of the heartbeat signal or the like is present operates from the selection target. In the case of a redundancy configuration, the selector 103a may also be configured in the redundancy configuration. In the case of a majority decision configuration, the selector 103a may be configured so that an error of the selector itself does not occur (a self-checking circuit).

If the cloud service providing device 2-1 and the cloud service providing device 2-2 constitute a redundancy pair, it is possible to cause a device using a cloud service to recognize the cloud service provided by the cloud service providing device 2-1 and the cloud service provided by the cloud service providing device 2-2 as the same service, for example, by identically setting network addresses thereof. In this case, the cloud service control device 1a can continuously use the service as it is without recognizing the abnormality of the cloud service providing device 2-1. On the other hand, if the cloud service provided by the cloud service providing device 2-1 and the cloud service provided by the cloud service providing device 2-2 are recognized as different services, there are some cases where the device using the cloud service does not continuously use the service. In the present embodiment, the verifier 102a verifies the operation state of the cloud service providing device 2-1, and a cloud service to be used is switched by the selector 103a, so that it becomes possible to continue using the service.

The information transferor 104a transfers information related to the cloud service selected by the selector 103a to the information using device 3 via the second communicator 105a. For example, the information transferor 104a may notify the information using device 3 of a verification result from the verifier 102a and a selection result from the selector 103a. FIG. 3 shows a case in which the information transferor 104a and the second communicator 105a individually correspond to the information using devices 3-1 to 3-3. Here, the information transferor 104a-1 and the information transferor 104a-2 indicate that redundancy is made for the information using device 3-1. The number of information using devices 3 connected to the cloud service control device 1a is arbitrary, and for example, four or more information using devices 3 may be connected.

<Third Configuration Example of Cloud Service Control System>

Figure 4:
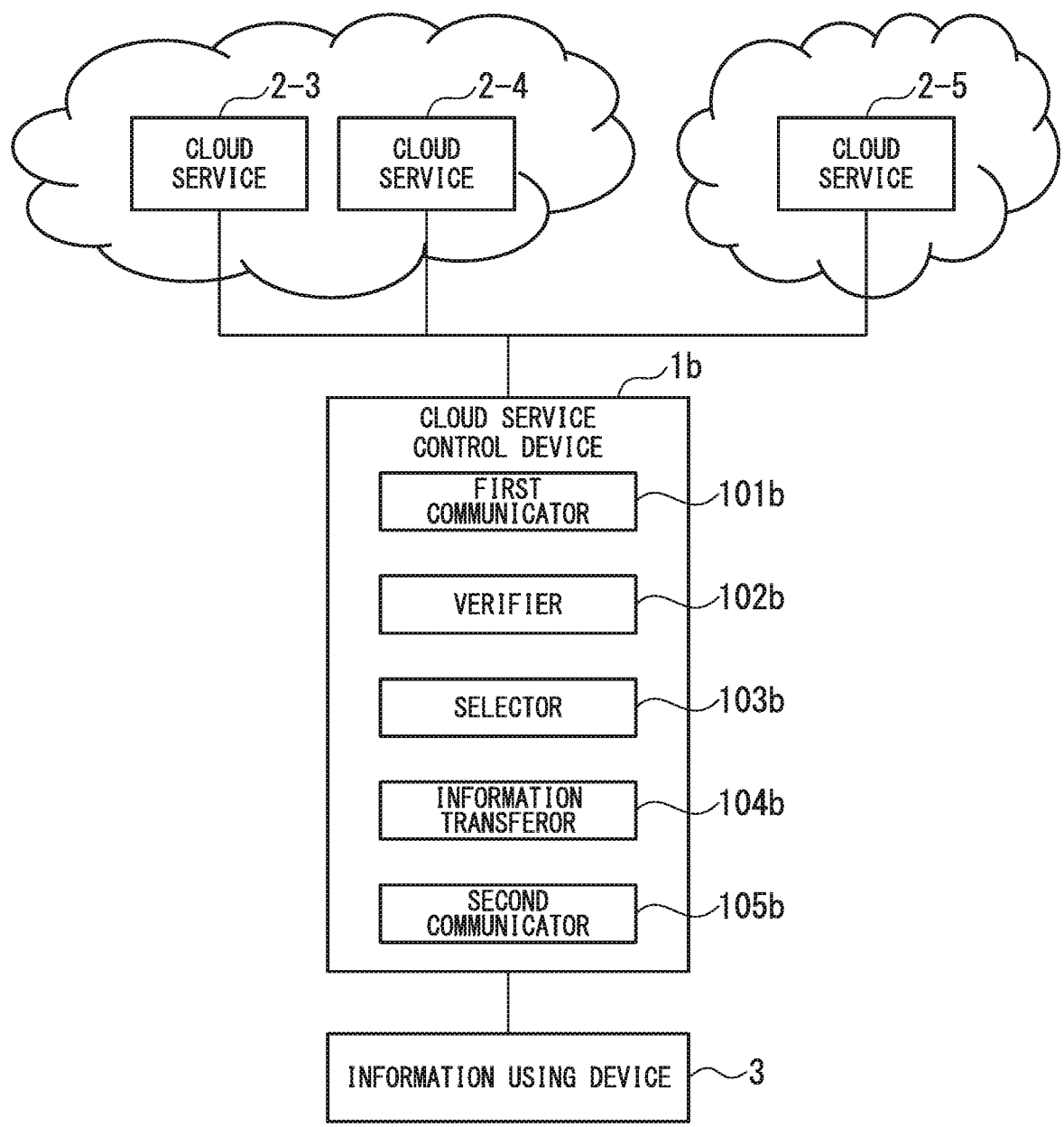
FIG. 4 is a diagram showing a third configuration example of a cloud service control system according to the embodiment.

Next, a third configuration of the cloud service control system described with reference to FIG. 1 will be described with reference to FIG. 4. FIG. 4 is a diagram showing a third configuration example of the cloud service control system according to the embodiment.

FIG. 4 shows a case in which there are a plurality of cloud services provided by the cloud service providing device 2 in FIG. 1 on the network (the cloud). In FIG. 4, the cloud service control system 100b includes a cloud service control device 1b, a cloud service providing device 2-3, a cloud service providing device 2-4, a cloud service providing device 2-5, and an information using device 3. The cloud service control device 1b is connected to the cloud service providing devices 2-3 to 2-5 via a network so that communication is enabled according to wired communication or wireless communication.

Each of the cloud service providing devices 2-3 to 2-5 provides an independent cloud service. For example, the cloud service providing device 2-3 and the cloud service providing device 2-4 are devices operating in the same domain, and the cloud service control device 1b may use any cloud service in the same authentication information. On the other hand, the cloud service providing device 2-5 is a device movable in a domain different from the cloud service providing device 2-3 and the like and may use the cloud service in other authentication information. These cloud service providing devices may have different usage conditions such as processing capability, a usage fee, and a security level.

The cloud service control device 1b has functions of a first communicator 101b, a verifier 102b, a selector 103b, an information transferor 104b, and a second communicator 105b. Each function of the first communicator 101b and the like has a function corresponding to a case in which there are a plurality of cloud service providing devices configured to provide cloud services with respect to each function of the first communicator 101 or the like described with reference to FIG. 1.

The first communicator 101b controls communication with the cloud service providing devices 2-3 to 2-5. The first communicator 101b performs control corresponding to a communication scheme, an authentication method, and the like corresponding to each cloud service providing device. The first communicator 101b may be configured to use each service by using authentication information from the authentication server configured to enable the use of cloud services of the cloud service providing devices 2-3 to 2-5.

The verifier 102b verifies operation states of the cloud service providing devices 2-3 to 2-5. In order to verify the operation states of a plurality of cloud service providing devices, for example, the following verification method can be used.

(1) Verification by Majority Decision

In the plurality of cloud service providing devices, output information corresponding to an ID of the input information (information series with a unique number) is specified using a result of processing certain input information as a processing result. If there is a difference in the comparison of processing results, it is determined that many identical processing results are correct processing results and it is verified whether or not the service providing device is outputting the correct processing result. If the number of cloud service providing devices is an even number and the number of processing results with a difference is the same, another verification method such as selection of a cloud service providing device selected in a previous verification result may also be used.

(2) Verification by Operation State of Cloud Service Providing Device

Operation states of the cloud service providing device such as a service stop history of the cloud service providing device, an acquisition time until a processing result is acquired from a processing result acquisition request for the cloud service providing device, the quality of a processing result such as erroneous calculation of the processing result, or a unit price of use per amount of processing are recorded and the operation states of the cloud service providing device are verified on the basis of a recording result. For example, if the acquisition time is verified as an operation state and if the processing result cannot be acquired within a predetermined time, the verifier 102 verifies that the operation state of the cloud service is defective. If the processing result cannot be acquired within the predetermined time, for example, there is a possibility that a malfunction such as a decrease in a processing rate of the cloud service providing device or deterioration of a network state has occurred. The predetermined time may be preset for each cloud service. By setting the predetermined time for each cloud service, it is possible to verify the appropriate operation state for each cloud service. If a plurality of operation states of each cloud service providing device are recorded, predetermined weighting may be performed for each operation state. For example, the verifier 102b verifies the operation state of the cloud service providing device by weighting the number of stops of service and an acquisition time. The verification of the operation state may be a processing result of one recording operation or processing results of a plurality of recording operations. For example, the verifier 102b performs verification so that a cloud service providing device first acquiring a processing result from among a plurality of cloud service providing devices always has priority. If a configuration based on majority decision is taken, the first communicator and the verifier are configured to be independent from each other such that they have 1:1 correspondence with respect to a cloud service provider, and a circuit configuration having a known erroneous detection function may be adopted so that it can be guaranteed that the selector does not have its own error.

(3) Verification by Designation of Cloud Service Providing Device

The verifier 102b pre-registers the priority of a cloud service providing device using a cloud service, verifies an operation of a cloud service providing device having highest priority, and uses a cloud service providing device having the next highest priority if the operation is determined to be abnormal. For example, the priority of the cloud service providing device may be registered by an operator from the display device 15 and the input device 16 in FIG. 2.

On the basis of the verification result verified by the verifier 102b, the selector 103b selects a cloud service provided by any one of the cloud service providing devices 2-3 to 2-5. For example, the operator may perform selection from the display device 15 and the input device 16 in FIG. 2.

The information transferor 104b transfers information related to the cloud service selected by the selector 103b to the information using device 3 via the second communicator 105b. For example, the information transferor 104b may be configured to notify the information using device 3 of a verification result from the verifier 102b and a selection result from the selector 103b.

<Fourth Configuration Example of Cloud Service Control System>

Figure 5:
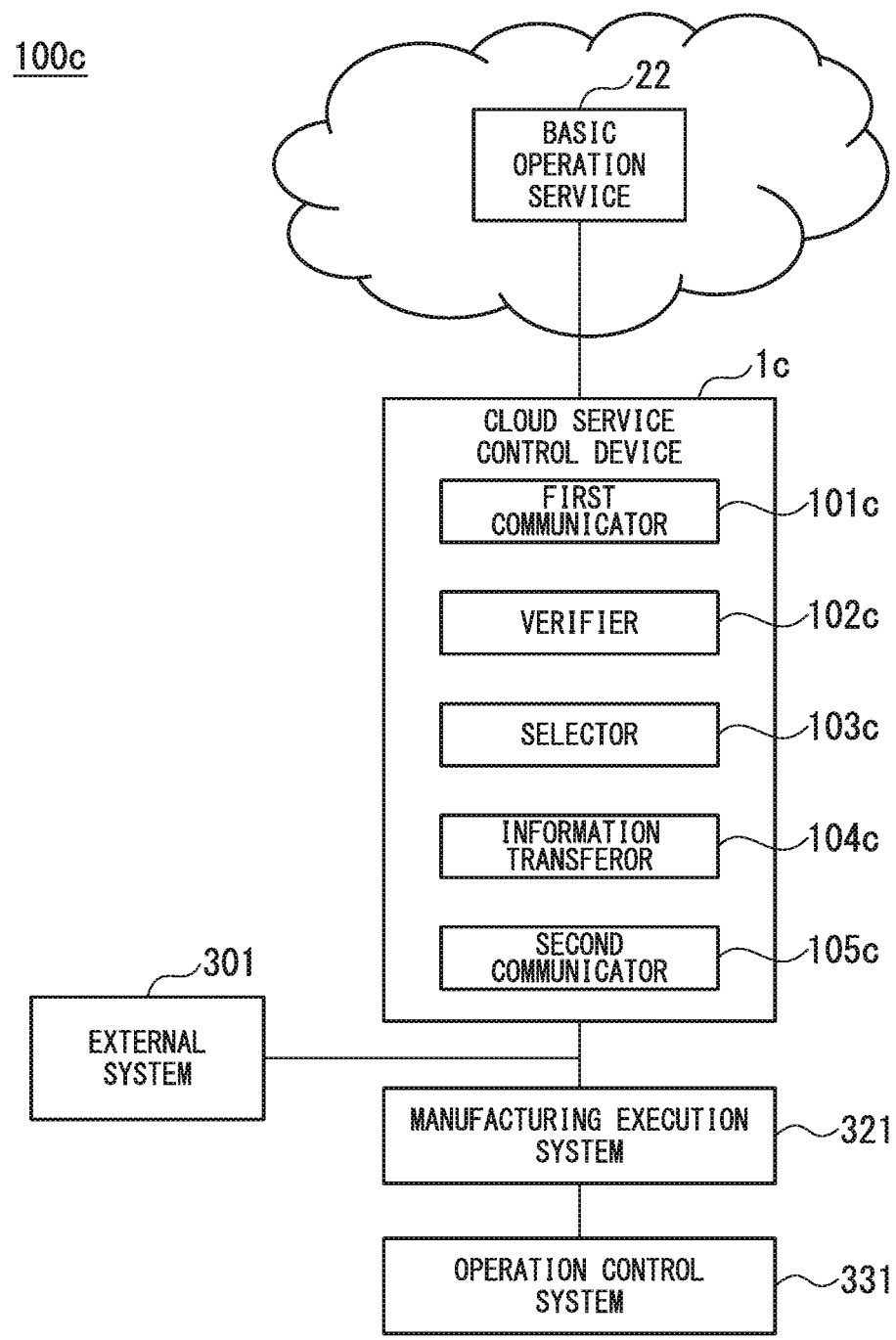
FIG. 5 is a diagram showing a fourth configuration example of a cloud service control system according to the embodiment.

Next, a fourth configuration of the cloud service control system described with reference to FIG. 1 will be described with reference to FIG. 5. FIG. 5 is a diagram showing a fourth configuration example of the cloud service control system according to the embodiment.

FIG. 5 shows a case in which the cloud service providing device 2 in FIG. 1 provides a service related to basic operation. In FIG. 5, the cloud service control system 100c includes a cloud service control device 1c, a cloud service providing device 22, an external system 301, a manufacturing execution system 321, and an operation control system 331. The cloud service control device 1c is connected to the cloud service providing device 22, the external system 301, and the manufacturing execution system 321 via a network so that communication is enabled according to wired communication or wireless communication. Here, the external system 301 is an example of the information using device and is connected to the second communicator 105c as in the manufacturing execution system 321.

The cloud service providing device 22 provides a service related to the basic operation. The service related to the basic operation is a service configured to provide a process which is executed in the basic operation system by the cloud service. The basic operation system is a system configured to manage management resources such as accounting processing, production management, and sales management of the entire company operating a plant. A cloud system configured to provide a process to be executed in the basic operation system is hereinafter referred to as a "basic operation service." For example, the basic operation service provides a service which is executed in an enterprise resource planning (ERP) system for the industry of process manufacturing configured to manage management resources such as production management. The ERP system manages order reception/ordering information, a production plan based on order reception/ordering information, information about production results based on an operating state of the plant, and the like. The basic operation service may include, for example, a maintenance management system or the like for managing business information of maintenance and repair of the plant, and the like. In the basic operation service, highly confidential information such as plant production plans and production results is processed. As shown in the configuration of FIG. 3, a plurality of cloud services may be configured to provide the basic operation service for redundancy of the basic operation service.

The external system 301 and the manufacturing execution system 321 are an example of the information using device 3 in FIG. 1. That is, the external system 301 and the manufacturing execution system 321 are devices configured to use information processed by the basic operation service provided by the cloud service providing device 22.

The external system 301 is, for example, an e-commerce (EC) system configured to perform electronic commerce. if the external system 301 is an EC system, the external system 301 transmits and receives information of order reception/ordering, for example, to and from the cloud service control device 1c. The external system 301 is, for example, a demand response (DR) system configured to adjust a supply-demand relationship for electric power. If the external system 301 is a DR system, the external system 301 transmits and receives information related to, for example, power consumption prediction, to and from the cloud service control device 1c. Here, information of order reception/ordering should not be incorporated into the DR system or information of the production plan should not be incorporated into an order reception/ordering system or the DR system. Thus, the information transferor 104c compares a "content list of information to be transferred" (an association list) specified with respect to each of the plurality of information using devices which are communication partners for transferring information with content of current information to be processed (transferred) and transfers only information capable of being transferred. For example, if a plurality of target information using devices cannot be identified with only an IP address, an ID number (a port number) for specifying one of a plurality of cloud services is assigned to information (a packet) and transferred, so that information to be transferred is limited.

The manufacturing execution system 321 is a manufacturing execution system (MES) located between the basic operation system and the operation control system, executes the production plan, and further monitors or manages an operation state of a plant, a work situation of a worker, or the like. For example, the manufacturing execution system 321 creates control information for controlling production facilities in the plant such that a production plan is executed on the basis of production plan information acquired from the basic operation service of the cloud service providing device 22 having the function of the basic operation system and transmits the control information to the operation control system 331 connected so that communication is made possible. The manufacturing execution system 321 is, for example, a general-purpose computer such as a server device, a desktop type PC, or the like.

The operation control system 331 is, for example, a device such as a DCS, an industrial computer, a programmable logic controller (PLC), or the like configured to control a field device or a facility control system of a plant (not shown). For example, the operation control system 331 acquires measurement values measured by field devices such as sensors on the basis of the control information acquired from the manufacturing execution system 321 and drives and controls field devices such as actuators.

<Fifth Configuration Example of Cloud Service Control System>

Figure 6:
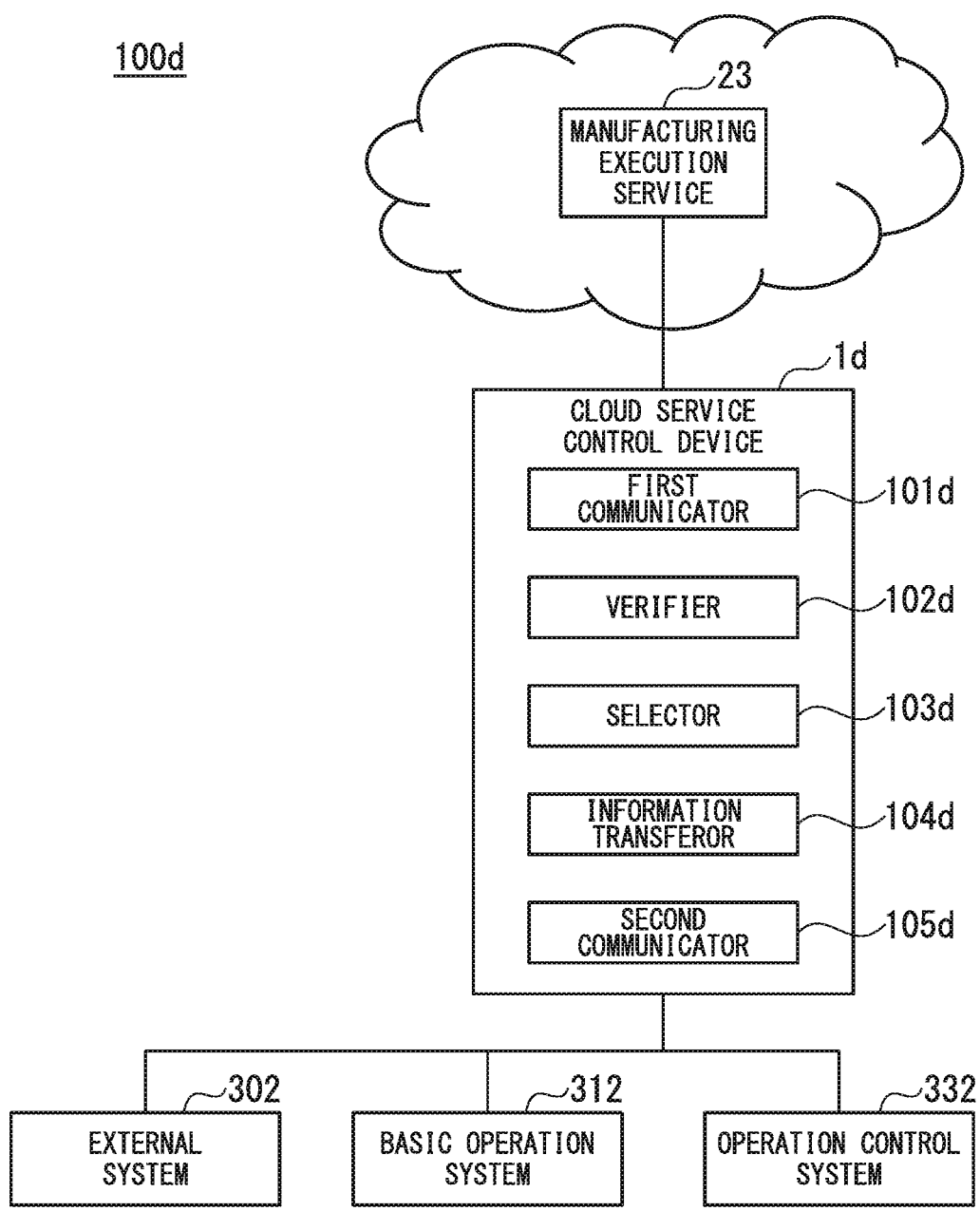
FIG. 6 is a diagram showing a fifth configuration example of a cloud service control system according to the embodiment.

Next, a fifth configuration of the cloud service control system described with reference to FIG. 1 will be described with reference to FIG. 6. FIG. 6 is a diagram showing a fifth configuration example of the cloud service control system according to the embodiment.

FIG. 6 shows a case in which the cloud service providing device 2 in FIG. 1 provides a service related to manufacturing execution. In FIG. 6, the cloud service control system 100d includes a cloud service control device 1d, a cloud service providing device 23, an external system 302, a basic operation system 312, and an operation control system 332. The cloud service control device 1d is connected to the cloud service providing device 23, the external system 302, the basic operation system 312, and the operation control system 332 via a network so that communication is enabled according to wired communication or wireless communication.

The cloud service providing device 23 provides a service related to manufacturing execution. The service related to manufacturing execution is a service which provides a process to be executed in the manufacturing execution system by a cloud service. As described above, the manufacturing execution system is a system configured to operate the operation control system on the basis of a production plan, monitor or manage the operation state of the plant, the work situation of a worker, or the like, and record and report actual production results. A cloud system configured to provide a process to be executed in the manufacturing execution system is hereinafter referred to as a "manufacturing execution service." For example, the manufacturing execution service creates control information for controlling the manufacturing facility in the plant on the basis of the information of the production plan acquired from the basic operation system 312, and transmits the control information to the cloud service control device 1d. In the manufacturing execution service, highly confidential information such as plant control information is processed. As shown in the configuration of FIG. 3, a plurality of cloud services may provide the manufacturing execution service in order to make the manufacturing execution service redundant.

The external system 302, the basic operation system 312, and the operation control system 332 are examples of the information using device 3 in FIG. 1. That is, the external system 302, the basic operation system 312, and the operation control system 332 are devices using the information processed by the manufacturing execution service provided by the cloud service providing device 23.

Similar to the external system 301, the external system 302 is an EC system, a DR system or the like. As described above, the basic operation system 312 is a system configured to manage management resources such as an accounting process, production management, and sales management of the entire company operating the plant. The basic operation system 312 is, for example, a general-purpose computer such as a server device, or a desktop type PC. The external system 302 may be constituted of the same or another cloud system.

<Sixth Configuration Example of Cloud Service Control System>

Figure 7:
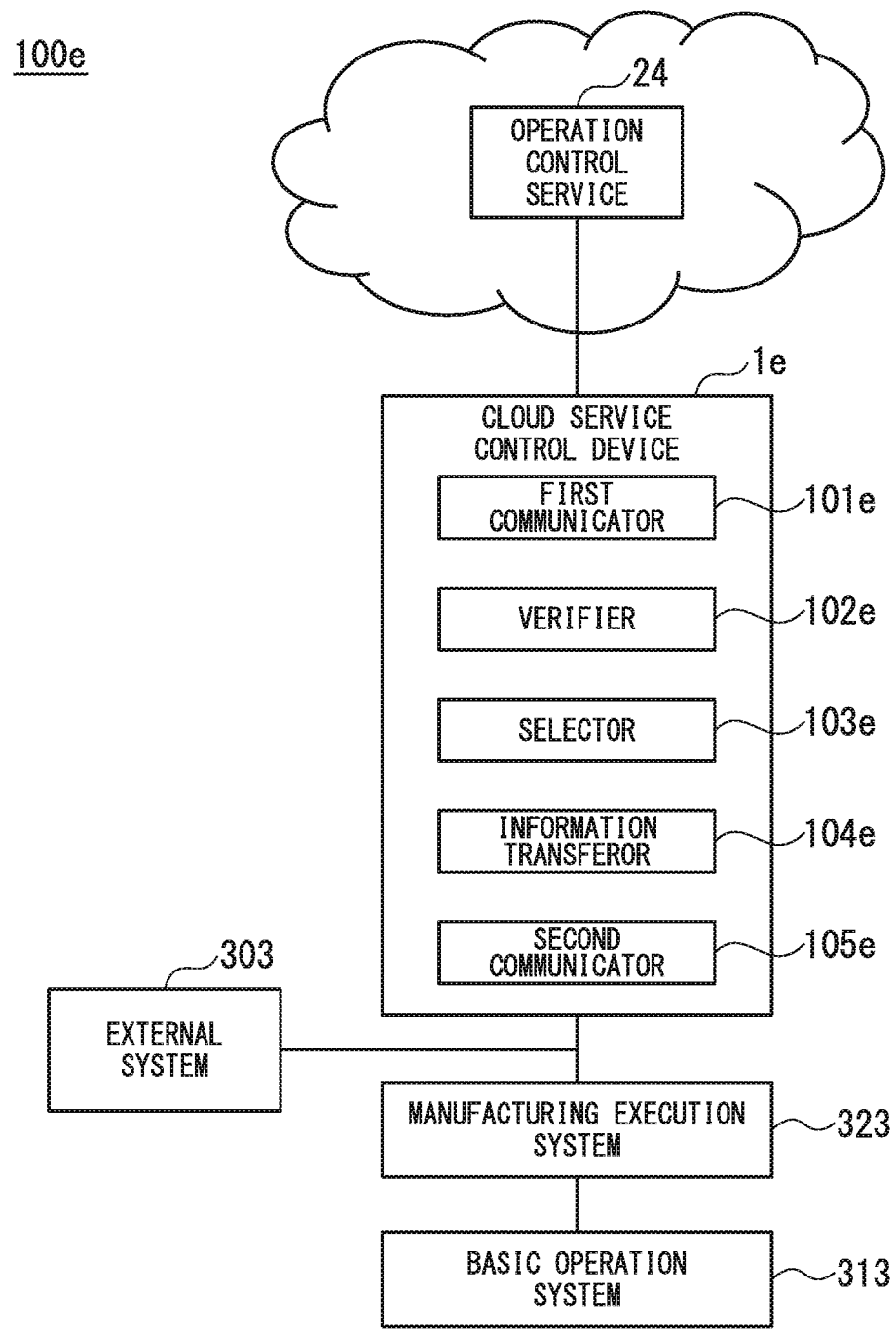
FIG. 7 is a diagram showing a sixth configuration example of a cloud service control system according to the embodiment.

Next, a sixth configuration of the cloud service control system described with reference to FIG. 1 will be described with reference to FIG. 7. FIG. 7 is a diagram showing a sixth configuration example of the cloud service control system according to the embodiment.

FIG. 7 shows a case in which the cloud service providing device 2 in FIG. 1 provides a service related to operation control. In FIG. 7, a cloud service control system 100e includes a cloud service control device 1e, a cloud service providing device 24, an external system 303, a manufacturing execution system 323, and a basic operation system 313. The cloud service control device 1e is connected to the cloud service providing device 24, the external system 303, the manufacturing execution system 323, a facility management system (not shown), a field device of a plant, a facility control system, etc. via a network so that communication is enabled according to wired communication or wireless communication.

The cloud service providing device 24 provides a service related to the operation control of the plant. The service related to the operation control is a service configured to provide a process to be executed in the operation control system by the cloud service. As described above, the operation control system is a system configured to control the field devices of a plant and operates in cooperation with an electric control system of motor control, pump control, or the like. A cloud system configured to provide a process to be executed in the operation control system is hereinafter referred to as an "operation control service." In accordance with the manufacturing execution plan acquired from the manufacturing execution system 323, for example, the operation control service generates control information for performing driving control, PID control, or the like on a field device such as an actuator on the basis of control information including setting values and setting timings of a field device and measurement values acquired from a field device such as a sensor and transmits the control information to the cloud service control device 1e. The cloud service control device 1e transfers the transmitted control information to a field device or a facility control system such as an electric control system of motor control, pump control, or the like via the second communicator 105e. In the operation control service, highly confidential information such as control information of the field device of the plant is processed. As in the configuration of FIG. 3, a plurality of cloud services may be configured to provide operation control services for redundancy of the operation control service.

In the operation control service provided by the cloud service providing device 24, information with a high real-time sensitivity for controlling the field device is processed. Therefore, high-speed communication is required for the communication between the first communicator 101e and the cloud service providing device 24, and a process with a high real-time sensitivity is also required for the cloud service providing device 24. The cloud service providing device 24 is constituted of hardware, an operating system, and the like with a high real-time sensitivity. The cloud service control device 1e may be configured to limit content to be processed by the operation control service to content which is not required to have an excessive real-time sensitivity.

<Other Sixth Configuration Example of Cloud Service Control System>

Figure 8:
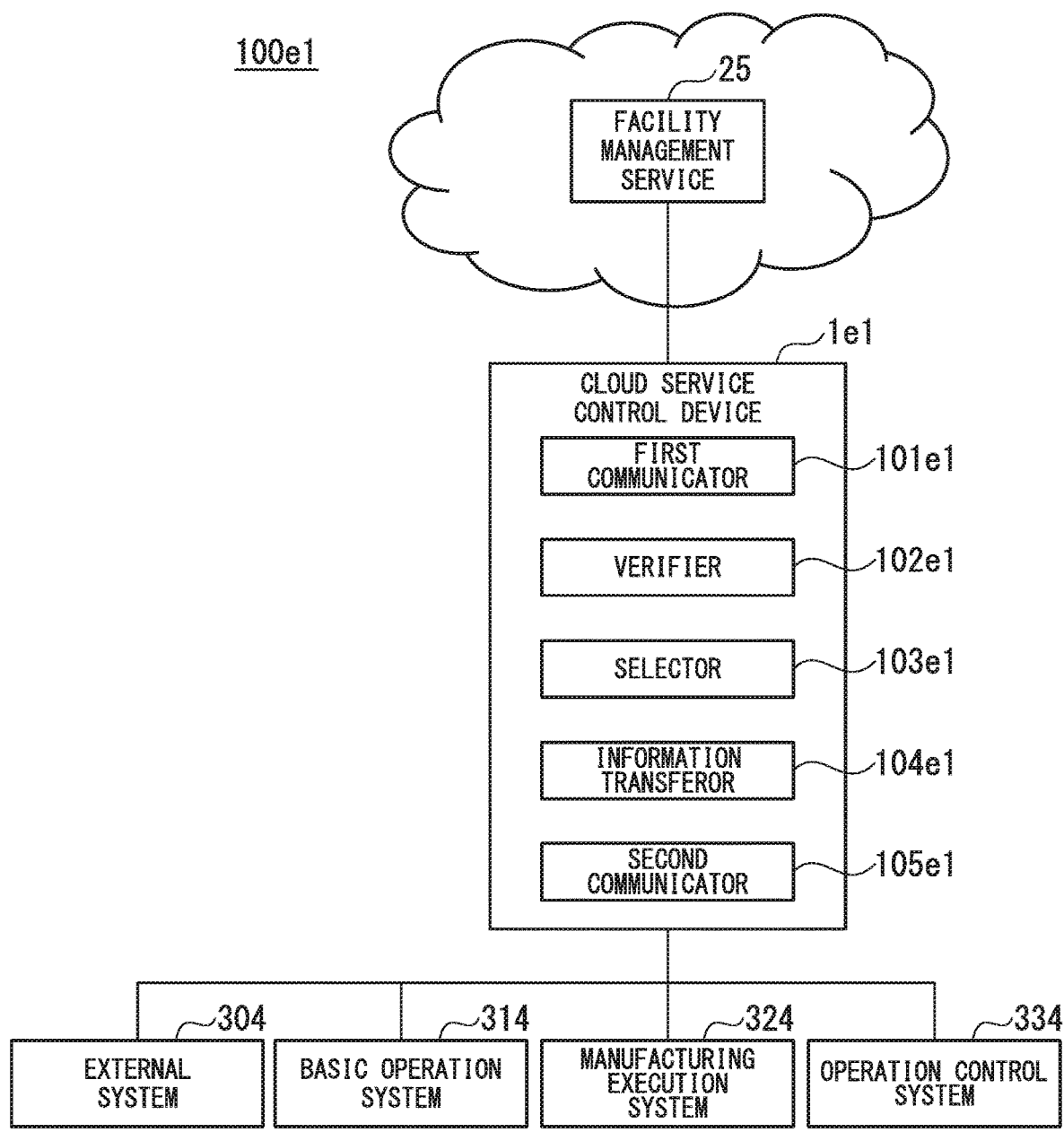
FIG. 8 is a diagram showing another sixth configuration example of a cloud service control system according to the embodiment.

Next, another sixth configuration of the cloud service control system described with reference to FIG. 1 will be described with reference to FIG. 8. FIG. 8 is a diagram showing another sixth configuration example of the cloud service control system according to the embodiment.

FIG. 8 shows a case in which the cloud service providing device 2 in FIG. 1 provides a service related to facility management. In FIG. 8, a cloud service control system 100e1 has a cloud service control device 1e1, a cloud service providing device 25, an external system 304, a basic operation system 314, a manufacturing execution system 324, and an operation control system 334. The cloud service control device 1e1 is connected to the cloud service providing device 25, the external system 304, the basic operation system 314, the manufacturing execution system 324, and the operation control system 334 via a network so that communication is enabled according to wired communication or wireless communication.

The cloud service providing device 25 provides a service related to facility management of a plant for monitoring and diagnosing states of various types of facilities including field devices such as control facilities responsible for an operation and automatic control of a single specific device constituting a plant (not shown). The service related to the facility management is a service which provides a process to be executed in the facility management system in a cloud service. As described above, the facility management system is a system configured to perform control of a facility or a system responsible for an operation and automatic control of a single specific facility constituting a plant and perform state monitoring and diagnosis of various types of facilities including a field device. A cloud system configured to provide a process to be executed in the facility management system is hereinafter referred to as a "facility management service." For example, the facility management service generates state monitoring and/or diagnosis information of field devices and/or various types of facilities necessary for the basic operation system 314 configured to manage management resources, the manufacturing execution system 324 configured to support an operation of a plant, an operation control system configured to perform operation control of all or a part of the plant, or the like and transmits the generated information to the cloud service control device 1e1. As in the configuration of FIG. 3, a plurality of cloud services may be configured to provide a facility management service for redundancy of the facility management service.

In the facility management service provided by the cloud service providing device 25, highly reliable information for performing state monitoring and/or diagnosis of various types of facilities including control facilities and field devices responsible for an operation and automatic control of a single specific facility constituting a plant is processed. Accordingly, communication with high reliability is required for communication between the first communicator 101e1 and the cloud service providing device 25, and highly reliable processing is also required for the cloud service providing device 25. The cloud service providing device 25 is constituted of hardware, an operating system, and the like with high reliability. The cloud service control device 1e1 may be configured to limit content to be processed by the facility management service to content which does not require excessive reliability.

<Another Second Configuration Example of Cloud Service Control System>

Figure 9:
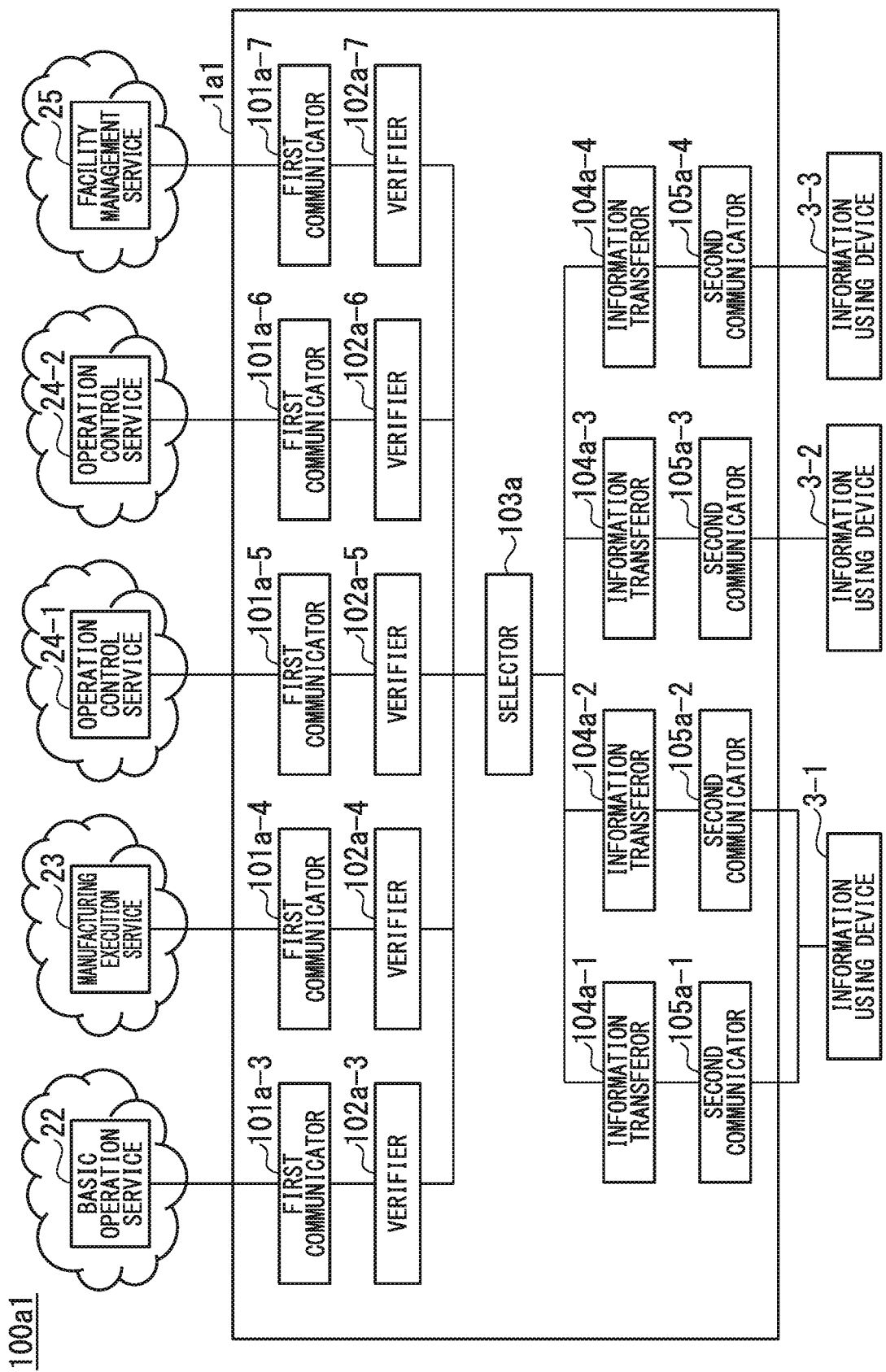
FIG. 9 is a diagram showing another second configuration example of a cloud service control system in the embodiment.

Next, another configuration of the second configuration of the cloud service control system described with reference to FIG. 3 will be described with reference to FIG. 9. FIG. 9 is a diagram showing another second configuration example of the cloud service control system according to the embodiment.

FIG. 9 shows a case in which the cloud service providing device 2 in FIG. 3 provides various cloud services. In the cloud service providing device 2 shown in FIG. 9, a self-diagnosis function described with reference to FIG. 3 is arbitrarily installed.

In FIG. 9, a cloud service control system 100a1 includes a cloud service control device 1a1, cloud service providing devices 22 to 25, an information using device 3-1, an information using device 3-2, and an information using device 3-3. The cloud service control device 1a1 is connected to the cloud service providing devices 22 to 25 via a network so that communication is enabled according to wired communication or wireless communication. The cloud service control device 1a1 is connected to the information using device 3-1, the information using device 3-2, and the information using device 3-3 via a network so that communication is enabled according to wired communication or wireless communication.

The cloud service providing device 22 provides a basic operation service. The cloud service providing device 23 provides a production execution service. The cloud service providing devices 24-1 to 24-2 provide operation control services. Further, the cloud service providing device 25 provides a facility management service.

The cloud service providing device 24-1 and the cloud service providing device 24-2 constitute a redundancy pair for providing operation control services. The operation control service is a cloud service that requires high reliability as described above. In the cloud service requiring such high reliability, the reliability of the cloud service control system 100a1 can be improved by making redundancy for the first communicator 101a and the verifier 102a.

The selector 103a can select cloud services of the cloud service providing devices 22 to 25 on the basis of verification results of the cloud service providing devices 22 to 25 verified by the verifiers 102a (102a-3 to 102a-7). Thus, by providing the functions of the first communicator 101a and the verifier 102a corresponding to each cloud service, the cloud service control device 1a1 enables a flexible system using cloud services to be constructed in accordance with the number and types of cloud services to be provided, the necessity for redundancy, or the like.

Although a case in which the cloud service providing devices 22 to 25 provide a basic operation service, a production execution service, an operation control service, and a facility management service has been described, a type of cloud service provided by the cloud service providing device is not limited thereto and the cloud service control device 1a1 can easily deal with additional types of cloud service or the like. Regarding the redundancy of the cloud service, the cloud service control device 1a1 can easily cope with multiplexing of triplication or more.

<Seventh Configuration Example of Cloud Service Control System>

Figure 10:
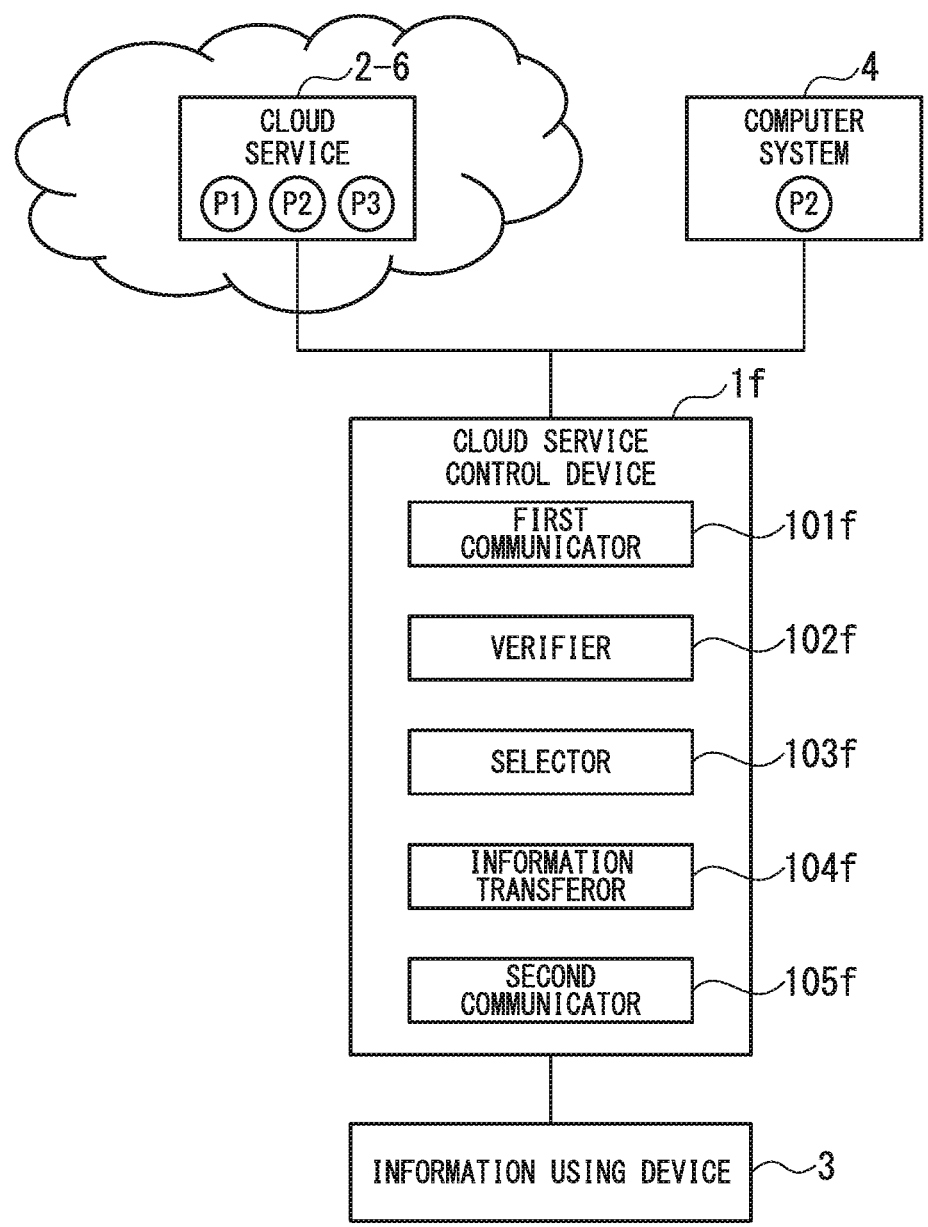
FIG. 10 is a diagram showing a seventh configuration example of a cloud service control system according to the embodiment.

Next, a seventh configuration of the cloud service control system described with reference to FIG. 1 will be described with reference to FIG. 10. FIG. 10 is a diagram showing a seventh configuration example of the cloud service control system according to the embodiment.

FIG. 10 shows a case in which the cloud service providing device 2 in FIG. 1 provides services for performing the same process as a process to be executed in the physical computer system in parallel. The service provided by the cloud service providing device 2 may be a service configured to provide some of processes to be executed by the physical computer system in parallel. The process to be executed in the physical computer system may be a process in which some of services provided by the cloud service providing device 2 are executed in parallel.

In FIG. 10, the cloud service control system 100f has a cloud service control device 1f, a cloud service providing device 2-6, a computer system 4, and an information using device 3. The cloud service control device 1f is connected to the cloud service providing device 2-6 and the computer system 4 via a network so that communication is enabled according to wired communication or wireless communication.

The cloud service providing device 2-6 provides a service for executing three processes which are a process P1, a process P2, and a process P3 in the cloud service. The processes P1 to P3 provided by the cloud service providing device 2-6 are processes to be executed by, for example, the above-described basic operation service, manufacturing execution service, operation control service, or the like. The computer system 4 executes the same process as the process P2 provided by the cloud service providing device 2-6 in the physical computer system.

The cloud service control device 1f has functions of a first communicator 101f, a verifier 102f, a selector 103f, an information transferor 104f, and a second communicator 105f. Functions of the first communicator 101f or the like include a function corresponding to a case in which services for performing the same process as the process to be executed by the cloud service providing device 2 on the physical computer system are provided in parallel with respect to each function of the first communicator 101 or the like described with reference to FIG. 1.

In the execution of processes P2 in the cloud service providing device 2-6 and the computer system 4, for example, a processing method of operating both the processes P2 in parallel and a processing method of operating either one process P2 at all times and operating the other process P2 in an emergency are possible. if the process P2 in the cloud service providing device 2-6 and the process P2 in the computer system 4 are operated in parallel, the verifier 102f compares and verifies both processing results, and the selector 103f selects either one processing result on the basis of a verification result. If either one of the process P2 in the cloud service providing device 2-6 and the process P2 in the computer system 4 is operated at all times, the verifier verifies the processing result of the process P2 which is operated at all times, and the selector 103f performs switching from one process for use to be operated at all times to the other process to be operated in an emergency on the basis of verification results.

Because the virtual computer system can virtually construct a system with software, it is easier to start, change, or suspend the provision of the service as compared with a physical computer system, and it is possible to easily shift some or all of processes to be executed on the computer system to the cloud service. The cloud service control device 1f includes the verifier 102f and the selector 103f described above and the like, so that it is possible to improve availability if the process is shifted to the cloud service. If the processing result of the cloud service provided by the cloud service providing device 2-6 of FIG. 10 and the processing result output from the physical computer in the computer system 4 continue during a predetermined period (for example, four years or more) and the same processing result is output, it may be determined that the computer system 4 is unnecessary and the computer system 4 may be deleted from the system configuration. Because the cloud service control device 1f can easily change the configuration of a plurality of cloud services or physical computer systems, it is possible to construct a flexible system according to a comparison of processing results between cloud services or between a cloud service and a physical computer system or a comparison of application costs.

Although an example in which the cloud service control system 100f includes only one cloud service providing device 2-6 and one computer system 4 is shown in HG. 10, the cloud service control system 100f may be provided with a plurality of cloud service providing devices 2-6 or a plurality of computer systems 4.

<Eighth Configuration Example of Cloud Service Control System>

Figure 11:
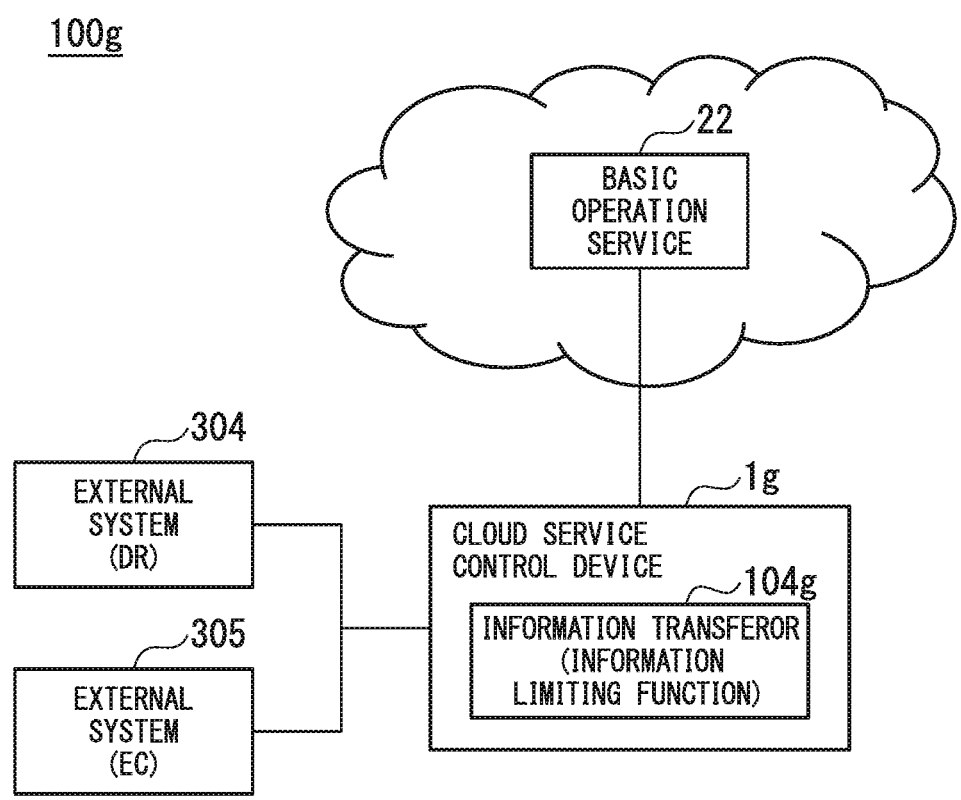
FIG. 11 is a diagram showing an eighth configuration example of a cloud service control system according to the embodiment.

Next, an eighth configuration of the cloud service control system described with reference to FIG. 1 will be described with reference to FIG. 11. FIG. 11 is a diagram showing an eighth configuration example of the cloud service control system according to the embodiment. FIG. 11 shows a case in which the information transferor 104 of the cloud service control device 1 in FIG. 1 has an information limiting function.

In FIG. 11, the cloud service control system 100g includes a cloud service control device 1g, a cloud service providing device 22, an external system 304, and an external system 305. The cloud service control device 1g is connected to the cloud service providing device 22, the external system 304, and the external system 305 via a network so that communication is enabled according to wired communication or wireless communication.

The external system 304 and the external system 305 are examples of the information using device 3 of FIG. 1 using the information processed in the basic operation service provided by the cloud service providing device 22 via the cloud service control device 1g. The external system 304 and the external system 305 are systems located outside an internal system in a range of the network in which security is secured, and are, for example, servers and the like outside the company. In FIG. 11, a case in which the external system 304 is a DR system is exemplified. The DR system transmits and receives information related to power consumption prediction to and from the cloud service control device 1g. A case in which the external system 305 is an EC system is exemplified. The EC system transmits and receives information of order reception/ordering to and from the cloud service control device 1g.

The cloud service control device 1g has an information transferor 104g. In FIG. 11, functions other than those of the information transferor 104 among functions shown in FIG. 1 are not shown. The information transferor 104g has an information limiting function. The information limiting function is a function of limiting information to be transmitted to the external system 304 or the external system 305. As described above, the cloud service control device 1g can acquire highly confidential information such as an operation plan to be used in plant control, know-how of the plant control, an operation state of a plant, and the like. If information is transmitted to the external system 304 or the external system 305, the cloud service control device 1g limits information to be transmitted.

Processing operations of the cloud service control device 1g, the cloud service providing device 22, the external system 304, and the external system 305 in the cloud service control system 100g will be described.

First, ordering information is input from a terminal device (not shown) of the external system 305 which is an EC system, and transmitted to the cloud service control device 1g. The ordering information includes, for example, information such as a specification, a quantity, a delivery date, and the like of a product. The cloud service control device 1g having acquired the ordering information transmits the acquired ordering information to the basic operation service provided by the cloud service providing device 22.

The basic operation service of the cloud service providing device 22 having acquired the ordering information analyzes information included in the ordering information and generates (updates) a production plan including an operation plan of each production facility on the basis of an already generated production plan or the like. The operation plan of the production facility may include, for example, a production plan for each product type in each production facility, a load situation in the production facility, and the like. The basic operation service generates predicted demand for energy (electric power) consumption in the production facility from the generated production plan.

The cloud service providing device 22 transmits the generated production plan and predicted demand to the cloud service control device 1g. Here, the information transferor 104g has an information limiting function, determines information that may be provided to the external system and information that is not provided thereto from information generated and acquired in the basic operation service of the cloud service providing device 22, and limits (filters) information to be transmitted. For example, because the information of the production plan includes the operation plan in the plant, the information transferor 104g does not transmit the information to the external system 304 and the external system 305. However, the information transferor 104g can transmit a delivery date of a product calculated from the production plan to the external system 305 having acquired the ordering information. The information transferor 104g transmits demand prediction information to the external system 304. However, information of demand prediction is not transmitted to the external system 305. For example, the information transferor 104g may be configured to limit the information to be transmitted to the external device by referring to setting information in which details of the information and an external device capable of transmitting information are associated in advance. Since the cloud service control device 1g has the information limiting function, the cloud service control device 1g can securely use the cloud service.

As described above, a cloud service control device of the present embodiment includes a first communicator configured to control communication with a cloud service configured to provide a plant control function of controlling a plant, a second communicator configured to control communication with a used device using service information related to the cloud service, a verifier configured to verify an operation state of the cloud service, a selector configured to select the cloud service on the basis of the verified operation state, and an information transferor configured to transfer the service information between the selected cloud service and the used device, thereby improving availability and security of information and enabling a shift to a faster and more flexible system.

It is only necessary for the above-described cloud service control device 1 to be a device having the above-described functions, and, for example, the above-described cloud service control device 1 may be configured by combining a plurality of devices and implemented by a system in which devices are communicably connected. The cloud service control device 1 may be implemented as a part of the functions of the information using device 3 described with reference to FIG. 1 and the like.

A cloud service control method of the present embodiment includes a verification step of verifying an operation state of a cloud service configured to provide a plant control function of controlling a plant; a selection step of selecting the cloud service on the basis of the verified operation state; and an information transfer step of transferring service information related to the cloud service between the selected cloud service and a used device using the service information related to the cloud service, thereby improving availability and security of information and enabling a shift for a faster and more flexible system.

An execution order of the above-described steps in the cloud service control method of the present embodiment is not limited to the described order of the above-described steps and the steps may be executed in any order.

Various processes described in the present embodiment may be performed by recording a program for implementing functions of the device described in the present embodiment on a computer-readable storage medium and causing a computer system to read and execute the program recorded on the storage medium. The "computer system" used here may include an operating system (OS) and hardware such as peripheral devices. If a World Wide Web (WWW) system is used, the "computer system" may include a homepage providing environment or displaying environment. The "computer-readable storage medium" refers to a storage device including a rewritable non-volatile memory such as a flexible disk, a magneto-optical disc, a read only memory (ROM), or a flash memory, a portable medium such as a compact disc (CD)-ROM, and a hard disk embedded in the computer system.

The "computer-readable storage medium" may include a medium that holds a program for a constant period of time, such as a volatile memory (for example, a dynamic random access memory (DRAM)) inside a computer system serving as a server or a client when the program is transmitted via a network such as the Internet or a communication circuit such as a telephone circuit. The above-described program may be transmitted from a computer system storing the program in a storage device or the like via a transmission medium or transmitted to another computer system by transmission waves in a transmission medium. The "transmission medium" for transmitting the program refers to a medium having a function of transmitting information, such as a network (communication network) like the Internet or a communication circuit (communication line) like a telephone circuit. The above-described program may be a program for implementing some of the above-described functions. The above-described program may be a program capable of implementing the above-described function in combination with a program already recorded on the computer system, i.e., a so-called differential file (differential program).

Although embodiments of the present invention have been described above with reference to the drawings, specific configurations are not limited to the embodiments, and various changes may also be included without departing from the scope of the present invention.

What is claimed is:

1. A cloud service control device comprising:
   a first communicator configured to control communication with a cloud service providing a plant control function of controlling a plant;
   a second communicator configured to control communication with a first device using service information related to the cloud service;
   a verifier configured to verify an operation state of the cloud service;
   a selector configured to select the cloud service on the basis of the verified operation state; and
   an information transferor configured to transfer the service information between the selected cloud service and the first device,
   wherein the information transferor is configured to limit a transfer of the service information in accordance with the first device on the basis of an association list in which the first device is associated with the service information transferable to the first device.

2. The cloud service control device according to claim 1, wherein
   the verifier is configured to verify the operation state of the cloud service on the basis of a self-diagnosis result of the cloud service having a self-diagnosis function.

3. The cloud service control device according to claim 1, wherein
   the verifier is configured to verify the operation state of the cloud service on the basis of fixed period information exchanged between the self-diagnosis function and the cloud service control device in a fixed period.

4. The cloud service control device according to claim 1, wherein
   the verifier is configured to verify the operation state of the cloud service on the basis of an acquisition time from a request of a process for the cloud service to acquisition of a processing result.

5. The cloud service control device according to claim 1, wherein
   the verifier is configured to verify operation states of a plurality of cloud services, and
   the selector is configured to select one cloud service from the plurality of cloud services on the basis of the verified operation states.

6. The cloud service control device according to claim 1, wherein
   the first communicator is configured to control communication with a physical computer system,
   the verifier is configured to verify operation states of the cloud service and the physical computer system, and
   the selector is configured to select any one of the cloud service and the physical computer system on the basis of the verified operation states.

7. The cloud service control device according to claim 1, wherein
the first communicator is configured to communicate with the cloud service for providing the plant control function related to basic operation, and
the information transferor is configured to transfer the service information related to the basic operation.

8. The cloud service control device according to claim 1, wherein
the first communicator is configured to communicate with the cloud service for providing the plant control function related to manufacturing execution of the plant, and
the information transferor is configured to transfer the service information related to the manufacturing execution.

9. The cloud service control device according to claim 1, wherein
the first communicator is configured to communicate with the cloud service for providing the plant control function related to operation control of the plant, and
the information transferor is configured to transfer the service information related to the operation control.

10. The cloud service control device according to claim 1, wherein
the first communicator is configured to communicate with the cloud service for providing the plant control function related to facility management of the plant, and
the information transferor is configured to transfer the service information related to the facility management.

11. The cloud service control device according to claim 1, wherein
the selector is configured to select any cloud service in any order.

12. The cloud service control device according to claim 1, wherein
the second communicator is configured to control communication with a second device which uses the service information related to the cloud service and which is located outside an internal system in a range of a network in which security is secured, and
the information transferor is configured to limit the service information to be transmitted to the second device by referring to setting information in which details of the service information and the second device to which the service information can be transmitted are associated in advance.

13. A cloud service control system comprising:
a cloud service configured to provide a plant control function of controlling a plant;
a first communicator configured to control communication with the cloud service;
a second communicator configured to control communication with a first device using service information related to the cloud service;
a verifier configured to verify an operation state of the cloud service;
a selector configured to select the cloud service on the basis of the verified operation state; and
an information transferor configured to transfer the service information between the selected cloud service and the first device,
wherein the information transferor is configured to limit a transfer of the service information in accordance with the first device on the basis of an association list in which the first device is associated with the service information transferable to the first device.

14. The cloud service control system according to claim 13, wherein
the verifier is configured to verify the operation state of the cloud service on the basis of a self-diagnosis result of the cloud service having a self-diagnosis function.

15. The cloud service control system according to claim 13, wherein
the verifier is configured to verify the operation state of the cloud service on the basis of fixed period information exchanged between the self-diagnosis function and the cloud service control device in a fixed period.

16. The cloud service control system according to claim 13, wherein
the verifier is configured to verify the operation state of the cloud service on the basis of an acquisition time from a request of a process for the cloud service to acquisition of a processing result.

17. The cloud service control system according to claim 13, wherein
the verifier is configured to verify operation states of a plurality of cloud services, and
the selector is configured to select one cloud service from the plurality of cloud services on the basis of the verified operation states.

18. A cloud service control method comprising:
verifying an operation state of a cloud service for providing a plant control function of controlling a plant;
selecting the cloud service on the basis of the verified operation state; and
transferring service information related to the cloud service between the selected cloud service and a first device using the service information related to the cloud service,
wherein transferring the service information comprises limiting a transfer of the service information in accordance with the first device on the basis of an association list in which the first device is associated with the service information transferable to the first device.

19. A non-transitory computer-readable storage medium storing a cloud service control program, which when executed by a computer, causes the computer to:
verify an operation state of a cloud service for providing a plant control function of controlling a plant;
select the cloud service on the basis of the verified operation state; and
transfer service information related to the cloud service between the selected cloud service and a first device using the service information related to the cloud service,
wherein transferring the service information comprises limiting a transfer of the service information in accordance with the first device on the basis of an association list in which the first device is associated with the service information transferable to the first device.

* * * * *